(12) United States Patent
Maatta et al.

(10) Patent No.: US 9,671,679 B2
(45) Date of Patent: Jun. 6, 2017

(54) APPARATUS COMPRISING FLASH LIGHT CIRCUITRY

(71) Applicant: Nokia Technologies Oy, Espoo (FI)

(72) Inventors: Esa-Sakari Maatta, Espoo (FI); Marko Eromaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/652,464

(22) PCT Filed: Dec. 20, 2012

(86) PCT No.: PCT/IB2012/057552
§ 371 (c)(1),
(2) Date: Jun. 16, 2015

(87) PCT Pub. No.: WO2014/096906
PCT Pub. Date: Jun. 26, 2014

(65) Prior Publication Data
US 2015/0331300 A1 Nov. 19, 2015

(51) Int. Cl.
*G03B 15/03* (2006.01)
*G02B 3/08* (2006.01)
*G02B 5/20* (2006.01)
*H04N 5/225* (2006.01)
*H04N 5/235* (2006.01)
*H04M 1/02* (2006.01)

(52) U.S. Cl.
CPC .............. *G03B 15/03* (2013.01); *G02B 3/08* (2013.01); *G02B 5/20* (2013.01); *H04N 5/2254* (2013.01); *H04N 5/2256* (2013.01); *H04N 5/2354* (2013.01); *G03B 2215/0592* (2013.01); *G03B 2215/0596* (2013.01); *H04M 1/0264* (2013.01); *H04M 1/0266* (2013.01)

(58) Field of Classification Search
CPC ................ G03B 15/05; G03B 2215/05; G03B 2215/0503; G03B 2215/0567; G03B 2215/0589; G03B 2215/0592
USPC ....................... 396/155; 348/371; 362/16, 17
See application file for complete search history.

(56) References Cited

U.S. PATENT DOCUMENTS

| | | | |
|---|---|---|---|
| 6,088,541 A | 7/2000 | Meyer | 396/155 |
| 2006/0103755 A1 | 5/2006 | Costigan et al. | |
| 2007/0025719 A1 | 2/2007 | Kashiwagi | 396/164 |
| 2009/0067062 A1 | 3/2009 | Suzuki et al. | 359/742 |
| 2012/0081910 A1 | 4/2012 | Saito | 362/327 |
| 2013/0176484 A1* | 7/2013 | Pilliod | G03B 15/05 348/373 |
| 2014/0152890 A1* | 6/2014 | Rayner | G06F 1/1626 348/376 |

FOREIGN PATENT DOCUMENTS

| | | |
|---|---|---|
| CN | 202133851 U | 2/2012 |
| EP | 2315063 A2 | 4/2011 |
| KR | 20100133594 A | 12/2010 |

* cited by examiner

*Primary Examiner* — Rochelle-Ann J Blackman
(74) *Attorney, Agent, or Firm* — Harrington & Smith

(57) ABSTRACT

An apparatus including flash light circuitry configured to emit a flash of light; an optically transparent window, overlying the flash light circuitry, configured to transmit externally an emitted flash of light from the flash light circuitry; and at least one filter configured to reduce total internal reflection of the flash of light within the optically transparent window.

20 Claims, 3 Drawing Sheets

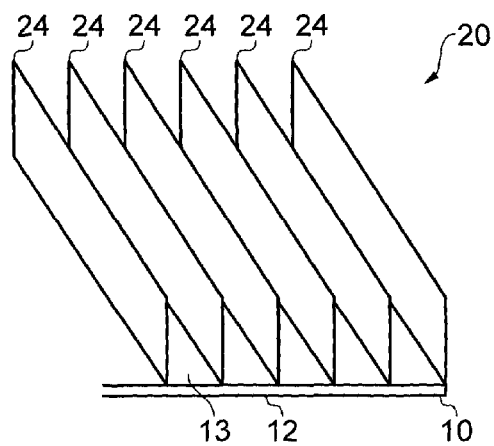
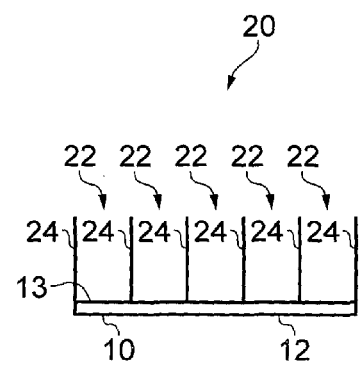
FIG. 5A  FIG. 5B
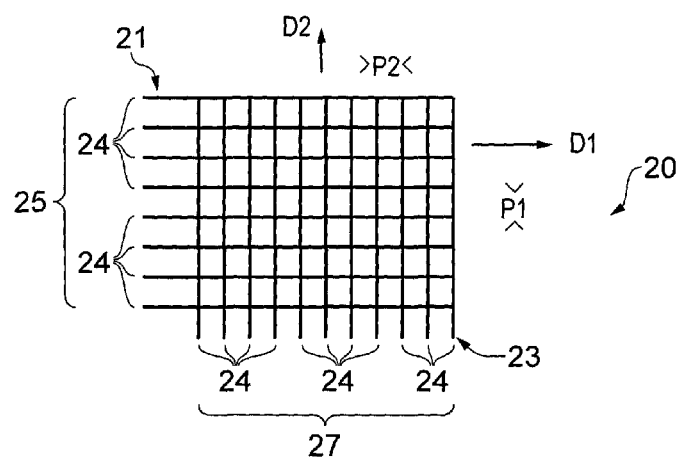
FIG. 6
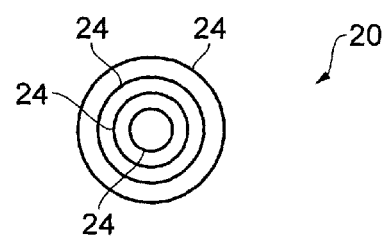
FIG. 7

APPARATUS COMPRISING FLASH LIGHT CIRCUITRY

TECHNOLOGICAL FIELD

Embodiments of the present invention relate to an apparatus comprising flash light circuitry. In particular, they relate to an apparatus comprising flash light circuitry and a camera sensor.

BACKGROUND

Flash light circuitry may be used to generate a flash of light. This may be used in photography to achieve an instantaneous illumination of the field of view.

A problem can arise when close objects reflect the flash of light into the camera sensor or material imperfections in transparent material cause light diffusion into the camera sensor. This may result in over-exposure of those objects in a captured image, non-wanted stray light effects or in an image of the flash itself being captured.

This problem is, for example, experienced if one attempts to capture an image through a glass window using flash photography.

BRIEF SUMMARY

According to various, but not necessarily all, embodiments of the invention there is provided an apparatus comprising: flash light circuitry configured to emit a flash of light; an optically transparent window, overlying the flash light circuitry, configured to transmit externally an emitted flash of light from the flash light circuitry; and at least one filter configured to reduce total internal reflection of the flash of light within the optically transparent window.

According to various, but not necessarily all, embodiments of the invention there is provided an apparatus comprising: flash light circuitry; an optically transparent window overlying the flash light circuitry configured to transmit a flash of light from the flash light circuitry; and at least one filter comprising a plurality of optical channels configured to control an angle of incidence of the flash of light at the optically transparent window.

The apparatus may, for example, be a photographic apparatus for illuminating a scene to be photographed.

BRIEF DESCRIPTION

For a better understanding of various examples of embodiments of the present invention reference will now be made by way of example only to the accompanying drawings in which:

FIGS. 5A and 5B illustrate an example of a filter comprising a plurality of parallel louvers in perspective view and cross-sectional view;

FIG. 6 illustrates an example of a filter that comprises a first filter component and an overlapping second filter component; and FIG. 7 illustrates, an example of a filter comprising a plurality of parallel louvers that are concentrically arranged.

DETAILED DESCRIPTION

Figure 1:
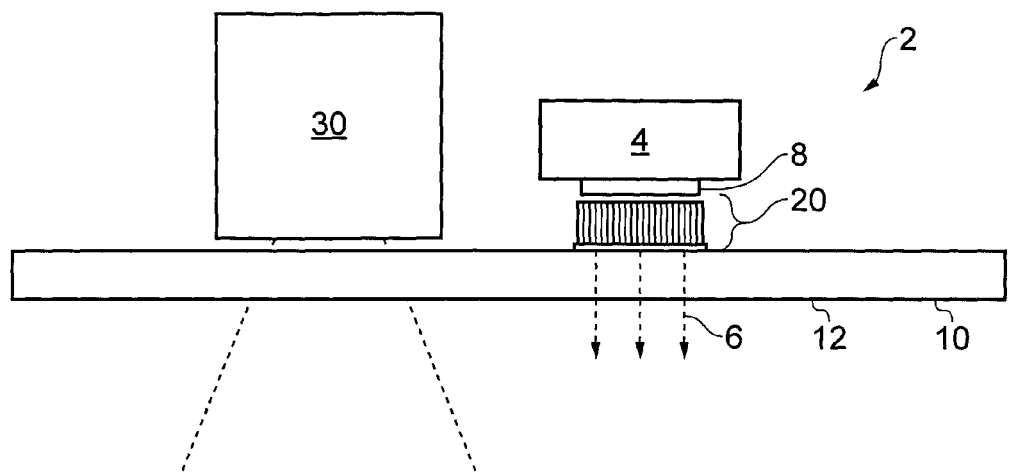
FIG. 1 illustrates an example of an apparatus that comprises both a camera sensor and flash light circuitry.

The Figures illustrate an apparatus 2 comprising: flash light circuitry 4 configured to emit a flash of light 6; an optically transparent window 10, overlying the flash light circuitry 4, configured to transmit externally an emitted flash of light 6 from the flash light circuitry 4; and at least one filter 20 configured to reduce total internal reflection of the flash of light 6 within the optically transparent window 10.

FIG. 1 illustrates an example of an apparatus 2 that comprises both a camera sensor 30 and flash light circuitry 4 and uses a common optically transparent window 10 for both the camera sensor 30 and the flash light circuitry 4. The optically transparent window 10 overlies both the camera sensor 30 and the flash light circuitry 4. The optically transparent window 10 has a continuous smooth exterior face 12 without a physical aperture for either the camera sensor 30 or the flash light circuitry 4.

The flash light circuitry 4 is configured to emit a flash of light 6. The optically transparent window 10 overlies the flash light circuitry 4. It is configured to transmit externally, beyond the apparatus 2, an emitted flash of light 6 from the flash light circuitry 4.

The apparatus 2 comprises a filter 20 configured to reduce total internal reflection of the flash of light 6 within the optically transparent window 10. The filter 20 mitigates against the shared optically transparent window 10 acting as a light guide and transferring a flash of light 6 transversely to the camera sensor 30.

Figure 2:
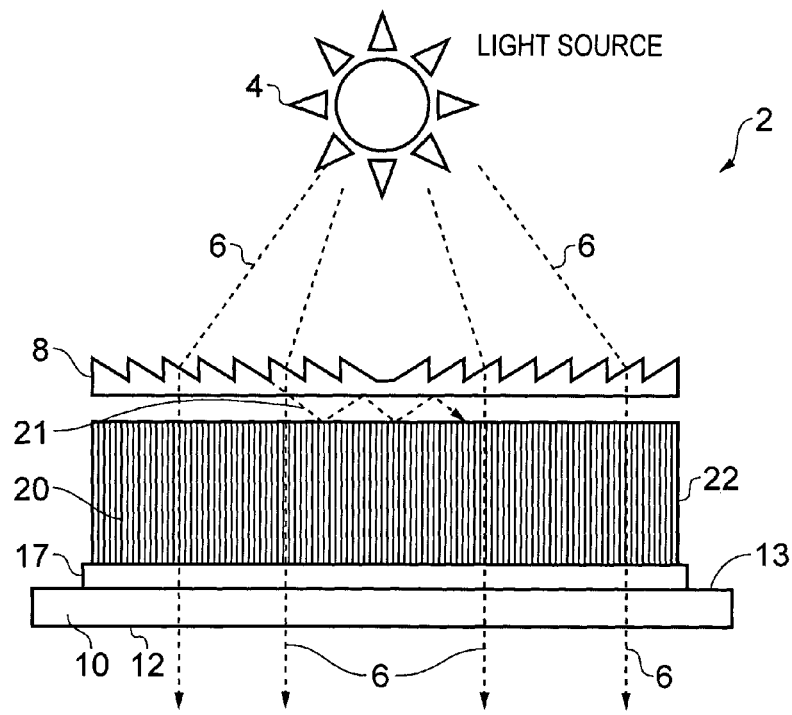
FIG. 2 illustrates a Fresnel lens positioned between the flash light circuitry and the optically transparent window.

In FIG. 2, a Fresnel lens 8 is positioned between the flash light circuitry 4 and the optically transparent window 10. The Fresnel lens is used to direct the flash of light 6 emitted from the flash light circuitry 4 in a direction substantially orthogonal to an exterior face 12 of the optically transparent window 10. While a Fresnel lens reduces the likelihood of light being totally internally reflected within the optically transparent window 10, light scattered by imperfections in the Fresnel lens 8 could be totally internally reflected within the optically transparent window 10. However, in FIG. 2, light scattered by imperfections in the Fresnel lens 8 that could be totally internally reflected within the optically transparent window 10 is filtered by the filter 20 and is not transmitted to the optically transparent window 10. The filter 20 mitigates against the shared optically transparent window 10 acting as a light guide and transferring a flash of light 6 transversely 21 to the camera sensor 30.

The filter 20 may comprise a plurality of parallel optical channels 22. The channels 22 are arranged with respect to the optically transparent window 10 to reduce total internal reflection of the flash of light 6 within the optically transparent window 10 without refracting or diffracting the flash of light.

The filter 20 is, in this example, adhered to the optically transparent window 10 using optically transparent adhesive 17.

Figure 3:
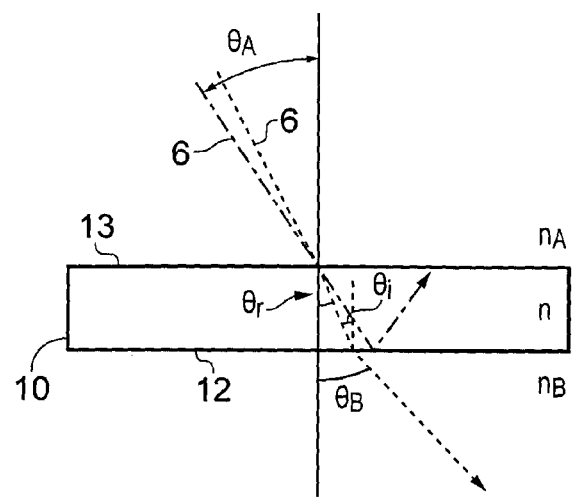
FIG. 3 illustrates a portion of the optically transparent window and light incident on the optically transparent window.

FIG. 3 illustrates a portion of the optically transparent window 10. If a beam of light is incident on an internal face 13 of the optically transparent window 10 from a medium A at an external angle of incidence $\theta_i$ then, according to Snell's law, the angle $\theta_r$ the refracted beam of light takes within the optically transparent window 10 is given by:

$$n_A \cdot \sin\theta_A = n \cdot \sin\theta_r$$

where $n_A$ is the refractive index of the medium A and n is the refractive index of the optically transparent window 10.

If the beam of light is then incident on the external face 12 of optically transparent window 10 at an internal angle of incidence $\theta_i$ then, according to Snell's law, the angle $\theta_B$ of the refracted beam of light takes into the adjacent medium B is given by:

$$n \cdot \sin \theta_i = n_B \cdot \sin \theta_B$$

where $n_B$ is the refractive index of the medium B.

By geometry, $\theta_i = \theta_r$ therefore $$\sin \theta_i = (n_B/n) \cdot \sin \theta_B = (n_A/n) \cdot \sin \theta_A = \sin \theta_r$$

which gives $$n_B \cdot \sin \theta_B = n_A \cdot \sin \theta_A$$

Total internal reflection occurs when $\theta_B > \pi/2$.

Therefore to avoid total internal reflection $$\sin \theta_A < n_B/n_A$$

The external angle of incidence $\theta_A$ of the light beam therefore must be less than a critical angle $\theta_{critical}$ defined by $\arcsin(n_B/n_A)$ to avoid total internal reflection of the light beam within the optically transparent window 10.

The filter 20 is configured to control the external angle of incidence $\theta_A$ of the flash of light 6 such that it is less than a critical angle $\theta_{critical}$ defined by $\arcsin(n_B/n_A)$.

Internal total internal reflection occurs within the optically transparent window 10 when $$\sin \theta_r = \sin \theta_i < n_B/n$$

If $n \leq n_A$ then $\theta_A$ should be less than the critical angle for transmission from the optically transparent window 10 to air e.g. 41.8° when $n_B/n=1/1.5$.

Referring back to FIG. 2, the plurality of parallel optical channels 22 obstruct the path of the flash light 6 from the flash light circuitry 4 and control the external angle of incidence $\theta_A$ of the flash of light 6 at an internal face 13 of the optically transparent window 10 to be less than critical angle $\arcsin(n_B/n_A)$.

Figure 4:
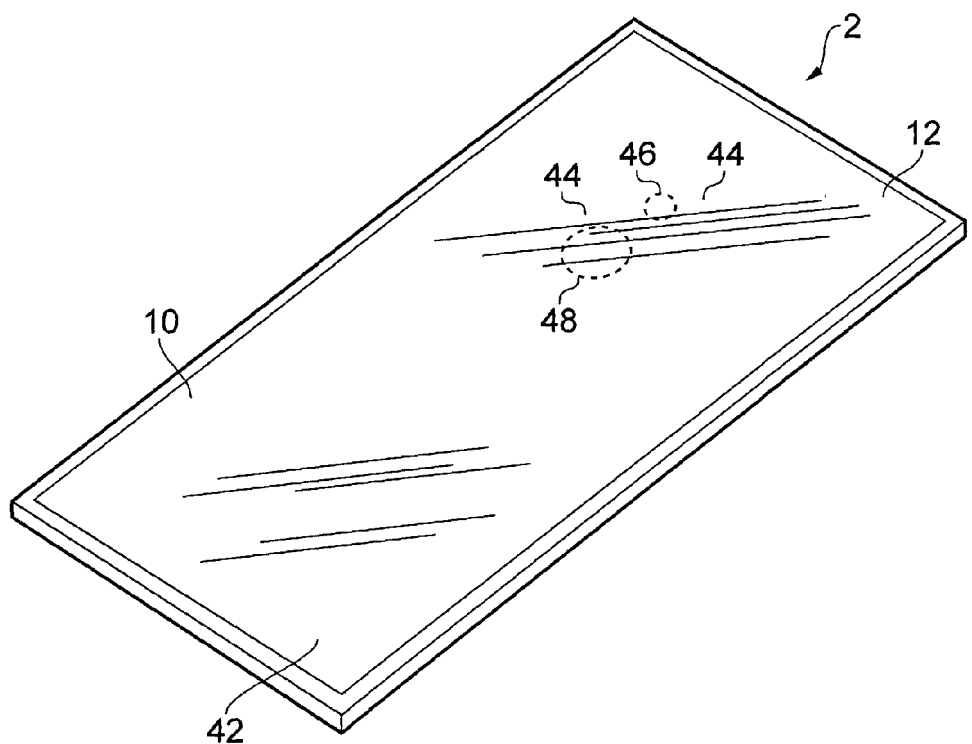
FIG. 4 illustrates an external view of an example of the apparatus.

FIG. 4 illustrates an external view of the apparatus 2. The optically transparent window 10 overlies both the camera sensor 30 and the flash light circuitry 4. The optically transparent window 10 has a continuous smooth exterior face 12 without a physical aperture.

The optically transparent window 10 forms a continuous exterior face 42 of the apparatus 2.

The optically transparent window 10 comprises black paint 44 on the interior face 13. An aperture 46 in the black paint 44 provides a flash output aperture to transmit a flash of light 6 emitted from the flash light circuitry 4. An aperture 48 in the black paint 44 provides a camera aperture to the camera sensor 30.

FIGS. 5A, 5B, 6 and 7 illustrate examples of filters 20. In these examples, the filter 20 comprises a plurality of louvers 24 configured to control an angle of incidence of the flash of light 6 at the internal face 13 of the optically transparent window 10. In FIGS. 5A, 5B and 6 the louvers 24 are rectilinear. In FIG. 7 the louvers 24 are concentric.

FIGS. 5A and 5B illustrate an example of a filter 20 comprising a plurality of parallel louvers 24 that extend in a direction parallel to the internal face 13 of the optically transparent window 10. FIG. 5A is a perspective view and FIG. 5B is a cross-sectional view. The parallel louvers 24 define a plurality of parallel optical channels 22 between the louvers 24. The height of the louvers 24 and the pitch distance between the louvers 24 are configured to reduce total internal reflection of the flash of light 6 within the optically transparent window 10 by only letting through light that has an external angle of incidence $\theta_A$ that it is less than the critical angle $\theta_{critical}$. The plurality of parallel optical channels 22 obstruct the path of light from the flash light circuitry 4 and control the external angle of incidence $\theta_A$ of the flash of light 6 at the internal face 13 of the optically transparent window 10 to be less than critical angle $\arcsin(n_B/n_A)$ In some but not necessarily all embodiments the louvers 24 may be angled at the same angle relative to the internal face 13 of the optically transparent window 10. In the illustrated embodiment, the louver angle (angle of attack) of the louvers 24 at the internal face 13 of the optically transparent window 10 is $\pi/2$. In other examples it may be an angle or angles less than $\pi/2$.

FIG. 6 illustrates an example of a filter 20 that comprises a first filter component 21 and a second filter component 23.

The first filter component 21 may be similar to the filter 20 illustrated in FIGS. 5A and 5B. A first plurality 25 of parallel rectilinear louvers 24 extends in a first direction D1. The first plurality of louvers 24 are separated by a pitch distance P1.

The second filter component 23 may be similar to the filter 20 illustrated in FIGS. 5A and 5B. A second plurality 27 of parallel rectilinear louvers 24 extends in a second direction D2. The second plurality of louvers 24 are separated by a pitch distance P2.

The first direction D1 and the second direction D2 are orthogonal and the first filter component 21 and the second filter component 23 overlie each other.

In this example the pitches P1 and P2 are the same and the louver angle of the first plurality 25 of parallel louvers 24 and the second plurality 27 of parallel louvers 24 is the same common louver angle.

FIG. 7 illustrates, an example of a filter 20 comprising a plurality of parallel louvers 24 that are concentrically arranged in a plane parallel to the internal face 13 of the optically transparent window 10.

The pitch distance between the concentric louvers 24 and/or the louver angle of the concentric louvers 24 and/or the height of the concentric louvers may vary with radial distance from a center of the concentric louvers 24.

The manufacture of the examples of the filters 20 described may be achieved by adapting techniques currently used in the manufacture of other products.

For example, the filter 20 may be made from a view-control-film formed by suspending black silicone rubber louvers 24 within transparent silicone rubber and adding polycarbonate film on the outer surfaces.

For example, the filter 20 may be made from a privacy screen (currently manufactured by Schott or 3M) that constrains the viewing angle of a computer screen.

As used here 'module' refers to a unit or apparatus that excludes certain parts/components that would be added by an end manufacturer or a user. The apparatus 2 may be a module or a complete device such as, for example, a hand-portable electronic device such as, for example, a digital camera, a video camera, a mobile cellular telephone, a tablet computer, a personal electronic device etc.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
 flash light circuitry configured to emit a flash of light;
 an image sensor;
 an optically transparent window, shared by the flash light circuitry and the image sensor, overlying the flash light circuitry and the image sensor, configured to transmit externally an emitted flash of light from the flash light circuitry; and
 at least one filter configured to reduce total internal reflection of the flash of light within the optically transparent window, wherein the at least one filter is configured to control an angle of incidence of the emitted flash of light at the optically transparent window.

2. An apparatus as claimed in claim 1, wherein the at least one filter is configured to control an angle of incidence of the emitted flash of light at the optically transparent window to be less than the critical angle for transmission from the optically transparent window to air.

3. An apparatus as claimed in claim 1, wherein the at least one filter comprises a plurality of parallel optical channels.

4. An apparatus as claimed in claim 3, wherein the plurality of parallel optical channels is arranged with respect to the optically transparent window to reduce total internal reflection of the flash of light within the optically transparent window.

5. An apparatus as claimed in claim 1, wherein the optically transparent window has a continuous smooth exterior face without a physical aperture.

6. An apparatus as claimed in claim 1, wherein the optically transparent window forms a continuous external face of the apparatus.

7. An apparatus as claimed in claim 1, wherein the optically transparent window comprises black paint on an interior surface and an aperture in the black paint provides a flash output aperture to transmit a flash of light emitted from the flash light circuitry.

8. An apparatus as claimed in claim 1, wherein the at least one filter is adhered to the optically transparent window.

9. An apparatus as claimed in claim 1, wherein a Fresnel lens is positioned between the flash light circuitry and the optically transparent window.

10. An apparatus as claimed in claim 1, wherein the at least one filter comprises a plurality of louvers configured to control an angle of incidence of the flash of light at the optically transparent window.

11. An apparatus as claimed in claim 1, wherein the at least one filter comprises a first filter component and an overlapping second filter component, wherein the first filter component comprises a first plurality of parallel louvers extending in a first direction and wherein the second filter component comprises a second plurality of parallel louvers extending in a second direction different from the first direction.

12. An apparatus as claimed in claim 11, wherein the first direction and the second direction are orthogonal and wherein the first plurality of parallel louvers and the second plurality of parallel louvers have a common louver angle.

13. An apparatus as claimed in claim 1, wherein the at least one filter comprises a plurality of concentric parallel louvers.

14. An apparatus as claimed in claim 1, wherein the filter overlies the flash circuitry only.

15. An apparatus as claimed in claim 1, wherein the optically transparent window is formed without an aperture.

16. An apparatus comprising:
 flash light circuitry;
 an image sensor;
 an optically transparent window, shared by the flash light circuitry and the image sensor, overlying the flash light circuitry and the image sensor, configured to transmit a flash of light from the flash light circuitry; and
 at least one filter comprising a plurality of optical channels configured to control an angle of incidence of the flash of light at the optically transparent window.

17. An apparatus as claimed in claim 16, wherein the at least one filter comprises a plurality of parallel optical channels, wherein the plurality of parallel optical channels is arranged with respect to the optically transparent window to reduce total internal reflection of the flash of light within the optically transparent window by controlling an angle of incidence of the emitted flash of light at the optically transparent window to be less than the critical angle for transmission from the optically transparent window to air.

18. An apparatus as claimed in claim 17 wherein the optically transparent window has a continuous smooth exterior face without a physical aperture.

19. An apparatus as claimed in claim 18, wherein the optically transparent window forms a continuous external face of the apparatus.

20. An apparatus as claimed in claim 16, wherein the at least one filter comprises a first filter component and an overlapping second filter component, wherein the first filter component comprises a first plurality of parallel louvers extending in a first direction and wherein the second filter component comprises a second plurality of parallel louvers extending in a second direction different from the first direction, wherein the first direction and the second direction are orthogonal and wherein the first plurality of parallel louvers and the second plurality of parallel louvers have a common louver angle.

* * * * *